United States Patent
Yoneda et al.

[11] Patent Number: 5,958,103
[45] Date of Patent: *Sep. 28, 1999

[54] PROCESS FOR PRODUCING PREFORM FOR GLASS FIBER AND PROCESS FOR PRODUCING GLASS FIBER

[75] Inventors: Yoshitaka Yoneda, Tokyo; Shozo Morimoto, Kanagawa-ken; Toshiharu Yamashita, Tokyo, all of Japan

[73] Assignees: Hoya Corporation, Tokyo; Nippon Sheet Glass Company Limited, Osaka-fu, both of Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/610,956

[22] Filed: Mar. 5, 1996

[30] Foreign Application Priority Data

Mar. 6, 1995 [JP] Japan .................................. 7-045865
Apr. 7, 1995 [JP] Japan .................................. 7-082538

[51] Int. Cl.$^6$ ...................... C03B 37/023; C03B 37/075; C03B 18/00; C03B 37/02
[52] U.S. Cl. ................. 65/385; 65/389; 65/404; 65/412; 65/435
[58] Field of Search .............. 65/385, 389, 401, 65/404, 405, 412, 435

[56] References Cited

U.S. PATENT DOCUMENTS

| | | | |
|---|---|---|---|
| 3,754,879 | 8/1973 | Phaneuf | 65/412 |
| 4,372,767 | 2/1983 | Maklad | 65/412 |
| 4,908,053 | 3/1990 | Nishii et al. | 65/DIG. 15 |

FOREIGN PATENT DOCUMENTS

| | | |
|---|---|---|
| 1-226748 | 9/1989 | Japan . |
| 1-230440 | 9/1989 | Japan . |
| 3-8742 | 1/1991 | Japan . |

*Primary Examiner*—Peter Chin
*Assistant Examiner*—Jacqueline A. Ruller
*Attorney, Agent, or Firm*—Nixon & Vanderhye P.C.

[57] ABSTRACT

A process for producing a preform for a chalcogenide glass fiber which comprises inserting a cladding tube having contained therein a chalcogenide glass rod for core into a quartz tube having at its bottom a nozzle having an aperture smaller than the outer diameter of the cladding tube, locally heating the bottom of the quartz tube and pulling the cladding tube having contained the glass rod for core and a process for producing a chalcogenide glass fiber by heating and drawing the preform thus obtained, by which processes the devitrification of glass and the generation of bubbles in the core glass or at the core glass-cladding glass interface can be prevented and the adhesion between the core glass and the cladding glass can be improved. In particular, when the glass material for core does not contain Ge, a chalcogenide glass fiber having such a core-cladding structure that the transmission loss of the glass fiber when infrared light pass through the fiber is small and the mechanical strength is high.

9 Claims, 5 Drawing Sheets

PROCESS FOR PRODUCING PREFORM FOR GLASS FIBER AND PROCESS FOR PRODUCING GLASS FIBER

BACKGROUND OF THE INVENTION

1. Field of the Invention

This invention relates to a process for producing a preform for a chalcogenide glass fiber of a core-cladding structure, a process for producing a chalcogenide glass fiber suitable to the transmission of infrared rays, particularly rays of 1 to 14 μm by using the above preform, and a chalcogenide glass fiber of a core-cladding structure excellent in infrared ray-transmissibility, particularly suitable to transmission of infrared signal light.

2. Prior Art

A cast method has been known as a method for producing a preform of a core-cladding unitary structure using chalcogenide glass. This cast method comprises casting molten core glass into a tube of cladding glass.

As other methods, JP-A-1-230,440 proposes a method for producing a preform of a core-cladding unitary structure by inserting a cladding glass tube into a quartz tube closed at its bottom, further inserting a core glass rod into the cladding glass tube, and heating the outer side of the quartz tube of the resulting assembly in this state by means of a ring heater while reducing the pressure in the space between the core glass rod and the cladding glass tube and applying a pressure to the space between the cladding glass tube and the quartz tube, thereby uniting the core glass and the cladding glass.

Chalcogenide glass fibers can be obtained by heat and drawing the preform obtained by the above cast method or the method of JP-A-1-230,440.

Moreover, there has been also known a method for producing a chalcogenide glass fiber directly from a core glass rod and a cladding glass tube without preparing a preform. As this method, JP-A-1-226,748 proposes a method for producing a glass fiber by inserting a cladding glass tube having contained therein a core glass rod, into a quartz tube having at its bottom a nozzle having an aperture smaller than the outer diameter of the cladding glass tube and drawing the resulting assembly while locally heating the lower portion of the assembly than the lower end of the quartz tube while controlling the gas pressure in the space between the cladding glass tube and the quartz tube so as to become higher than the gas pressure in the space between the core glass rod and the cladding glass tube.

It is well known that chalcogenide glass is thermally unstable. Accordingly, in the method for producing a chalcogenide glass fiber by the above-mentioned cast method, there is such a problem that the glass is devitrified in the course of the production of a preform. In addition, the molten core glass easily takes in bubbles during the casting and these bubbles remain as broths at the interface of the core glass and the cladding glass. When the preform containing these broths is formed into fibers, the broths have become a cause of increasing the transmission loss. By this cast method, it has been impossible to produce a preform for a single mode fiber in which the core diameter is much smaller than the cladding diameter.

The method stated in JP-A-1-230,440 for obtaining a preform by uniting the core glass and the cladding glass under control of the pressure in a quartz tube whose bottom is closed can considerably inhibit the devitrification of glass and the generation of bubbles in the core glass or at the core glass-cladding glass interface as compared with the cast method. However, the preform obtained cannot be said to be sufficient in adhesion between the core glass and the cladding glass, and an improvement in adhesion has been desired. Also, this method for producing a preform was unable to produce a preform for a single mode fiber in which the core diameter is much smaller than the cladding diameter.

On the other hand, in the method stated in JP-A-1-226,748 for producing a glass fiber directly from a core glass rod and a cladding glass tube without preparing any preform, there has been such a problem that since the cladding glass tube having contained therein the core glass rod must be heated at a high drawing temperature from the beginning, the chalcogenide glass tends to be devitrified and the composition tends to be changed by volatilization. The said method for the direct production of a fiber has such a disadvantage that it is difficult to obtain a single mode fiber in which the core diameter is much smaller than the cladding diameter. Moreover, according to the method for the direct production of a fiber, when it is intended to produce fibers having different diameters, a plurality of quartz tubes having drawing nozzles having correspondingly different diameters must be used and when a fiber having a specific diameter has become necessary, it is difficult to obtain such a fiber in a short period of time.

Furthermore, as to the chalcogenide glass fiber of a core-cladding structure, the technique stated in, for example, JP-A-3-8,742 has heretofore been known. This technique intends to provide a power transmission fiber in which each of the core glass and the cladding glass is composed of three elements of As (arsenic), S (sulfur) and Ge (germanium) for enhancing particularly the heat resistance and Se (selenium) is substituted for a part of the S (sulfur) in the core glass for controlling the numerical aperture (NA) of the fiber.

However, in the case of the above technique, in order to enhance the heat resistance of a power transmission infrared fiber, Ge element is contained in both the core glass and the cladding glass, and hence, the fact that both contain Ge makes it basically difficult to make the transmission loss lower than a certain level. Also, since Ge is contained in both the core glass and the cladding glass, a sufficient difference in thermal expansion between the two is not obtained in the formation of a fiber and hence it is impossible to enhance the mechanical strength of the fiber.

In addition, in the case of the above core-cladding structure, there is such a problem that infrared rays passing through the cladding side become a noise when an optical signal is transmitted and the optical signal to be transmitted in the core undergoes a disturbance.

SUMMARY OF THE INVENTION

The first object of this invention is to provide a process for producing a preform for a chalcogenide glass fiber by which the problems admitted in the above-mentioned prior art methods including devitrification of glass, generation of bubbles in the core glass or at the core glass-cladding glass interface, incomplete adhesion at the core glass-cladding glass interface and the like have been solved.

The second object of this invention is to provide a process for producing a preform for a chalcogenide glass fiber suitable for obtaining a single mode fiber in which the core diameter is much smaller than the cladding diameter.

The third object of this invention is to provide a process for producing a chalcogenide glass fiber which makes it possible to obtain, from the preform obtained by the processes for producing a preform mentioned in the above first and second objects, a fiber whose diameter is varied depending upon the drawing conditions in a short period of time without using the quartz tube having spinning nozzles different in diameter and without causing devitrification and composition change due to volatilization.

The fourth object of this invention is to provide a chalcogenide glass fiber having a core-cladding structure by which the transmission loss of fiber during the transmission of an infrared signal light has been minimized and the mechanical strength of fiber has been enhanced.

The fifth object of this invention is to provide a chalcogenide glass fiber having a core-cladding-cladding structure which has been protected from disturbing light to improve transmission characteristics.

According to this invention, there is provided a process for producing a preform for a chalcogenide glass fiber which comprises inserting a cladding chalcogenide glass tube having contained therein a chalcogenide glass material for core, into a quartz tube having at its bottom a nozzle having an aperture smaller than the outer diameter of the cladding glass tube, locally heating the bottom of the quartz tube and pulling out the cladding glass tube having contained therein the glass material for core [this process is referred to hereinafter as the production process (1) in some cases].

According to this invention, there is further provided another process for producing a preform for a chalcogenide glass fiber which comprises inserting, as a glass material for core, the preform obtained by the above production process (1) into a cladding glass tube, repeating at least one time the production process (1) mentioned above using the resulting assembly to obtain a preform for a single mode fiber in which the core diameter is extremely small as compared with the cladding diameter [this process is referred to hereinafter as the production process (2) in some cases].

According to this invention, there is still further provided a process for producing a chalcogenide glass fiber which comprises polymer-coating the preform obtained by the production process (1) or (2) with an polymer-coating material and heat and drawing the coated preform.

This invention further provides a chalcogenide glass fiber having a core-cladding structure in which the core glass is composed of two elements of As (arsenic) and S (sulfur) and the cladding glass (referred to hereinafter as the first cladding glass in some cases) is composed of three elements of As (arsenic), S (sulfur) and Ge (germanium) and also a chalcogenide glass fiber having a core-cladding-cladding structure in which the above fiber having a core-cladding structure is covered with a second cladding glass having a refractive index lower than that of the above core glass but higher than that of the above first cladding glass, the second cladding glass being composed of three elements of As (arsenic), S (sulfur) and Ge (germanium).

BRIEF DESCRIPTION OF THE DRAWINGS

In FIGS. 1 to 4, 1 refers to a quartz tube, 2 to a core rod, 3 to a cladding glass tube, 4 to the bottom of the quartz tube, 5 to a nozzle, 6 to the upper part of the quartz tube, 7 to a pressurizing tube, 8 to the space between the quartz tube and the cladding tube, 9 to the space between the cladding glass tube and the core rod, 10 to a pressure-reducing tube, 11 to a preform, 12 to a heat-shrinkable resin tube, 13 to a ring heater, 14 to a fiber, 15 to the tip of the preform, 16 to a weight, 17 to core glass, 18 to cladding glass of the first composition, 19 to cladding glass of the second composition and 20 to a heat-shrunk resin layer.

In FIGS. 5 to 7, 101 refers to a core rod, 102 to a cladding tube, 103 to a cover, 104 to a resin tube, 105 to a resin tube, 106 to a sucking resin tube, 107 to a crucible, 108 to a nozzle, 109 to an inlet for inert gas, 110 to a suction port, 111 to an inlet for inert gas, 112 to an atmosphere conditioning chamber, 113 to a fiber diameter measuring instrument, 114 to a resin coater, 115 to a UV irradiation chamber, 116 to print rollers, 117 to a local heater, 120 to core glass, 121 to first cladding glass and 122 to second cladding glass.

DETAILED DESCRIPTION OF THE INVENTION

Figure 1:
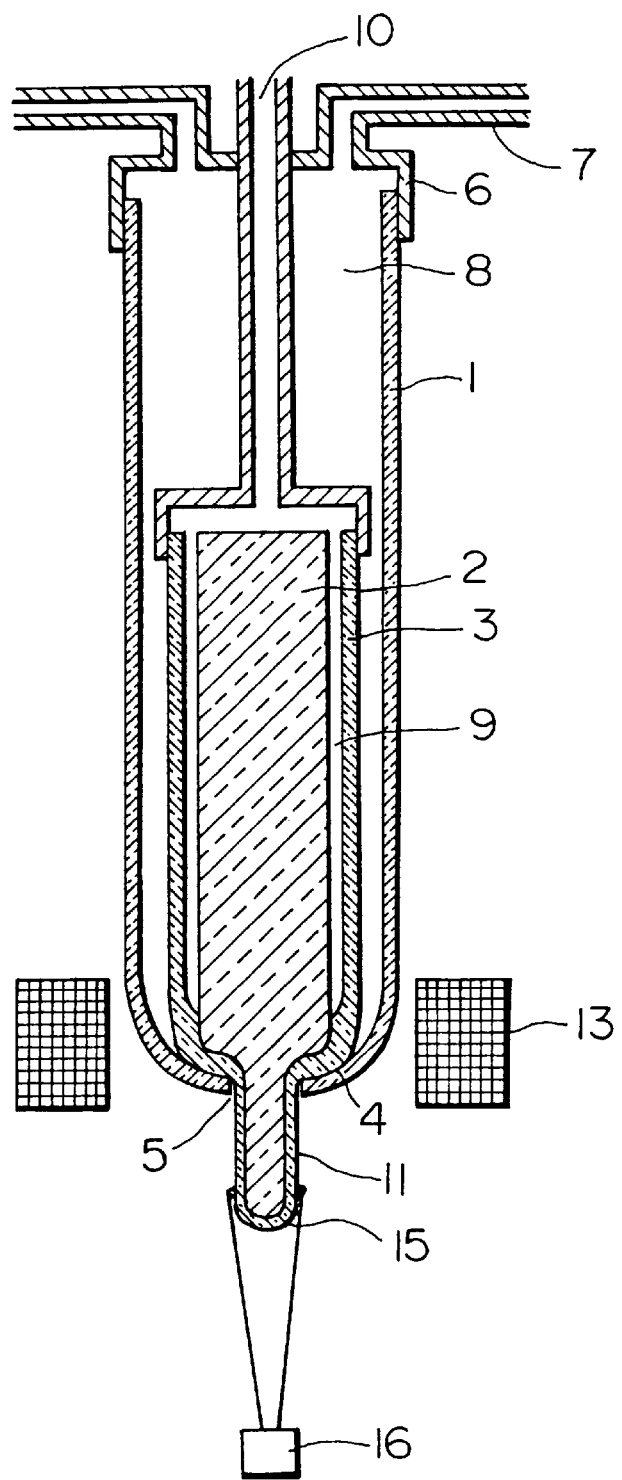
FIG. 1 is a crosssectional view showing the process for producing a preform of this invention.

First of all, an explanation is made of the production process (1) below.

The production process (1) comprises inserting a cladding chalcogenide glass tube having contained therein a chalcogenide glass material for core, into a quartz tube having at its bottom a nozzle having an aperture smaller than the outer diameter of the cladding glass tube, locally heating the bottom of the quartz tube and pulling out the cladding glass tube having contained therein the glass material for core, thereby obtaining a preform for a chalcogenide glass fiber.

According to the production process (1), unlike the conventional cast method in which the whole of the glass material for core is heated and melted, the glass material is heated only at the bottom of the quartz tube, whereby the problems of devitrification of glass and generation of bubbles in the core glass or at the core glass-cladding glass interface which problems are seen in the conventional cast method have been solved.

Also, according to the production process (1), the core glass and the cladding glass are forcibly melt-united in such a dynamic state that the cladding glass tube having contained therein the glass material for core is heated and then pulled from the nozzle at the bottom of the quartz tube, thereby obtaining a preform. Therefore, as compared with the method stated in JP-A-1-230,440 in which a cladding glass tube having contained therein a glass material for core is statically heated in a bottom-closed quartz tube having no nozzle at the bottom to unite the core glass and the cladding glass, the production process (1) is advantageous in that a preform excellent in adhesion between the core glass and the cladding glass is obtained.

In the production process (1), it is preferable that the pressure in the space (i) between the glass material for core and the cladding glass tube is made relatively lower than the pressure in the space (ii) between the cladding glass tube and the quartz tube, whereby the devitrification of glass and generation of bubbles in the core glass or at the core glass-cladding glass interface can be more effectively inhibited and the adhesion between the core glass and the cladding glass is further enhanced. In particular, it is more preferable to keep the space (i) under reduced pressure and the space (ii) under elevated pressure. The pressure in the space (i) between the glass material for core and the clad glass tube is preferably 15 Pa or less, more preferably 1.5 Pa or less. The pressure in the space (ii) between the cladding glass tube and the quartz tube is preferably $2.0 \times 10^4$ Pa or more, more preferably $2.0 \times 10^5$ Pa or more.

In the production process (1), it is preferable to control the heating temperature at the bottom of the quartz tube to a temperature lower than the drawing temperature, whereby it becomes possible to obtain a preform having a large diameter and also prevent the devitrification of glass in the production of the preform.

The heating temperature (Th) at the bottom of the quartz tube is particularly preferably controlled to a temperature 40–150° C. lower than the drawing temperature (Tf). The reason therefor is as follows: When Th>(Tf–40) and the temperature Th is relatively high, the thermally unstable chalcogenide glass is easy to devitrify and crystallization tends to be caused particularly in the core glass or at the core glass-cladding glass interface. When the preform obtained under such conditions is drawn into a fiber, the transmission loss of the fiber obtained becomes remarkably large, and the volatilization of the glass component causes a change in composition. On the other hand, when Th<(Tf–150) and the temperature Th is relatively low, the chalcogenide glass is not sufficiently softened, and it becomes impossible to pull out the cladding glass united with the core glass from the nozzle of the quartz tube or even if the pulling is possible, a sufficient adhesion between the core glass and the cladding glass is not obtained, the transmission loss becomes large and the fiber strength becomes low.

When the cladding glass tube having contained therein the glass material for core is pulled from the quartz tube, it is preferable to hang a weight from the tip of the cladding glass tube. When a weight is hung the following effects can be obtained:

(a) The preform is formed into a straight rod and hence the fiber yield is increased when this preform is drawn into a fiber.

(b) The drawing speed of the preform becomes constant and hence the diameter of preform is stabilized and the same effect as in (a) (increase of the fiber yield) is obtained.

The weight can be suitably determined and generally, a weight of 50 g or more is preferred.

An explanation is further made of the production process (2) below.

The production process (2) uses the preform for a chalcogenide glass fiber obtained by the production process (1) as a glass material for core and is characterized by repeating at least one time the production process (1) using a cladding glass tube having the preform contained therein, whereby a preform for a single mode fiber having a core diameter much smaller than the cladding diameter can be obtained.

The production process (2) is basically the repetition of the production process (1) and hence, as a matter of course, the advantage obtained by the production process (1) (inhibition of devitrification of glass, inhibition of generation of bubbles and improvement of adhesion) can also be brought about by carrying out the production process (2).

The preforms for a glass fiber obtained by the production processes (1) and (2) can be drawn in a conventional manner into glass fibers, and it is possible to form a protective coating layer consisting of a resin on the glass fiber thus obtained by passing the glass fiber through a vessel containing the resin. The resin used is preferably a UV curable resin; however, this is not critical and any resin can be used as far as it has a fiber-protective function. For example, a thermosetting resin can be used.

Next, the process for producing a chalcogenide glass fiber is explained.

The process for producing a chalcogenide glass fiber comprises adhesion-coating the preform for a chalcogenide glass fiber obtained by the production process (1) or (2) with an adhesion-coating material and heating and drawing the coated preform to obtain a chalcogenide glass fiber.

According to the above process for producing a glass fiber, the coating of the preform with an adhesion-coating material makes it possible to produce fibers having varying diameters freely by varying the processing conditions including drawing temperature, drawing speed and the like without using an expensive quartz tube at the time of drawing. Also, by previously preparing the preform, the fiber can be produced whenever necessary in a short time. According to said process for producing a glass fiber, the adhesion-coating material applied to the preform can inhibit the composition change due to volatilization of a chalcogenide glass fiber upon heating at the time of drawing can be inhibited, whereby a chalcogenide glass fiber having the desired properties can be obtained.

The above adhesion-coating material may be any material as far as it is good in adhesion to the preform and can prevent the chalcogenide glass fiber from being volatilized upon heating at the time of drawing. In particular, the use of a heat-shrinkable tube renders the adhesion-coatability on the preform particularly good and makes it possible to markedly inhibit the glass component from being volatilized from the preform. The heat-shrinkable tube is generally smoother at its opening portion than the quartz tube and hence when the other area of the preform than its end portion is adhesion-coated with the heat-shrinkable tube and the preform is heated and drawn, the fiber can be prevented from being wounded.

The heat-shrinkable tube includes (a) heat-shrinkable tubes of fluoroplastics such as Teflon FEP (tetrafluoroethylene-hexafluoropropylene copolymer), polyvinylidene fluoride, Teflon PFA (tetrafluoroethylene-perfluoroalkoxyethylene copolymers), Teflon TFE (polytetrafluoroethylene resin) and the like; (b) heat-shrinkable tubes of silicone rubbers; (c) heat-shrinkable tubes of synthetic rubbers such as neoprene, Viton and the like; (d) heat-shrinkable tubes of polyolefins such as cross-linked polyolefins and the like; (e) heat-shrinkable tubes of vinyl chloride resins and the like. The use of a heat-shrinkable tube having a melting point or softening point close to that of chalcogenide glass is preferable because said use makes it possible to carry out simultaneously the adhesion-coating of the preform with a heat-shrinkable tube and the drawing of the preform into a fiber. As such a heat-shrinkable tube, there is mentioned a tube made of a fluoroplastic such as Teflon or the like. This fluoroplastic is preferred because it is excellent in heat-conductivity, and hence, the time required for heating can be shortened and the yield can be increased as compared with the case where a quartz tube is used.

The whole area of the preform may be coated with the adhesion-coating material, or the other area of the preform than its end portion to be subjected to heating and drawing may be coated with the polymer-coating material. In the former case, the preform and the adhesion-coating material are simultaneously subjected to heating and drawing, thereby obtaining a glass fiber having a triple layer structure of core glass, cladding glass and polymer-coating material. In the latter case, only the preform is subjected to heating and drawing, so that a glass fiber having a double layer structure of core glass and cladding glass is obtained. In this case, the double layer structure fiber after the drawing can be passed through a vessel containing a resin to form a protective coating layer consisting of the resin. The resin used is preferably a UV curable resin as already mentioned above; however, any resin such as a thermosetting resin or the like can be used as far as it has a fiber-protecting function.

Explanations have been made above concerning the preform production processes (1) and (2) as well as the fiber production process. The term "chalcogenide glass" used herein should be interpreted broadly and refers generically to a glass comprising basically a chalcogen element S, Se or Te among the elements of the VIB Group of the Periodic Table and other component As, P, Sb, Si, Ge, Sn or the like. In addition, the process of this invention can also be applied to a glass having a volatility such as a fluoride glass.

Next, the glass fibers according to the invention are described.

In the chalcogenide glass fiber having a core-cladding structure of this invention, the core glass is composed of two elements of AS (arsenic) and S (sulfur) and the cladding glass is composed of the above two elements and Ge (germanium) whereby the refractive index of the clad glass can be made lower than that of the core glass. In addition, since the core glass does not contain Ge, the transmission loss of the core glass can be basically made smaller.

The thermal expansion coefficient of the cladding glass can be made smaller than that of the core glass by incorporating Ge (germanium) into the cladding glass, and this has such an effect that a compression stress can be imparted to the cladding glass to heighten the mechanical strength. In addition, when the compositions of the core glass and the cladding glass fall outside the predetermined ranges, the glass is apt to become unstable. That is to say, when the proportion of Ge is less than 0.5 atm %, it is difficult to allow the cladding glass to have a sufficient refractive index difference, and when the proportion of Ge is more than 7 atm %, the cladding glass have too different properties from those of the core glass to be used as a preferable cladding glass.

The composition of the core glass used in the core-cladding structure chalcogenide glass fiber of this invention is preferably such that the proportion of As is 25 to 55 atm % and the proportion of S is 45 to 75 atm %, the total of the composition being 100 atm %, and the composition of the cladding glass used is preferably such that the proportion of As is 18 to 54 atm %, the proportion of S is 46 to 80 atm % and the proportion of Ge is 0.5 to 7 atm %, the total of the composition being 100 atm %.

In the chalcogenide glass fiber having a core-cladding-cladding structure of this invention, the core-cladding structure chalcogenide glass fiber is further covered with a second cladding glass having a refractive index lower than that of the core glass but higher than that of the first cladding glass (namely, the cladding glass of the above core-cladding structure) of the fiber, whereby the light having passed through the first (inner) clad glass is absorbed by the second cladding glass and dispersed and hence such an adverse effect can be prevented that a disturbance is given as a noise light to the signal light having passed through the core. In this case, when the composition of the second cladding glass is limited to the predetermined range, the same effect is obtained as in the case of the core-cladding structure chalcogenide glass fiber.

In the core-cladding-cladding structure chalcogenide glass fiber of this invention, the composition of core glass used is preferably such that the proportion of As is 25 to 55 atm % and the proportion of S is 45 to 75 atm %, the total of the composition being 100 atm %, and each of the compositions of the first cladding glass and the second glad glass used is preferably such that the proportion of As is 18 to 54 atm %, the proportion of S is 46 to 80 atm % and the proportion of Ge is 0.5 to 7 atm %, the total of the composition being 100 atm %.

In the core-cladding fiber and core-cladding-cladding fiber of the invention, since Ge is incorporated into the clad glass to make the refractive index lower than that of the core glass and the core glass does not contain Ge, the transmission loss of the core glass can be basically made smaller. Moreover, since Ge is incorporated into the cladding glass, the thermal expansion coefficient of the cladding glass becomes smaller than that of the core glass, and hence, when the cladding glass containing the core glass therein is drawn into a fiber, it is possible to allow the cladding glass to generate a compression stress. That is, the enhancement of the mechanical strength of fiber becomes possible.

Moreover, when the fiber is covered with the second cladding glass which has a refractive index higher than that of the first cladding glass but lower than that of the core glass, the light having passed through the first cladding glass can be absorbed by the second cladding glass and dispersed to prevent a disturbance from adversely affecting the signal light passing through the core glass.

WORKING EXAMPLE

Example 1

(1) Preform-Production Example

First of all, an example is explained according to FIG. 1. A cladding tube 3 having inserted thereinto a core rod 2 was sealed into a quartz tube 1. At the bottom 4 of the quartz tube 1, a nozzle 5 having a smaller aperture than the outer diameter of the cladding tube 3 was provided. In the upper part 6 of the quartz tube 1, a pressurizing tube 7 connected to the space 8 between the quartz tube 1 and the cladding tube 3 was installed. A very slight amount of an Ar gas was introduced through the pressurizing tube 7 to fill the space 8 with the Ar gas. On the other hand, the pressure of the space 9 between the core rod 2 and the cladding tube 3 was reduced to 1.5 Pa by a vacuum pump through a pressure-reducing tube 10 installed so as to be connected to the space 9.

The glass composition of the core rod 2 was adjusted to Ge 5 atm %/As 42 atm %/S 53 atm % and the glass composition of the cladding tube 3 was adjusted to Ge 5 atm %/As 40 atm %/S 55 atm %. In this case, the outer diameter of the cladding tube 3 was adjusted to 12.5 mm and the inner diameter thereof was adjusted to 10.5 mm. The outer diameter of the core rod 2 was adjusted to 9.5 mm and the aperture of the nozzle 5 of the quartz tube 1 was adjusted to 9 mm.

The vicinity of the nozzle 5 of the quartz tube 1 was heated by a ring heater 13 to 300° C. and when the tip of the cladding tube 3 was softened and closely contacted with the nozzle 5, an Ar gas was introduced through the pressurizing tube 7 to adjust the pressure of the space 8 to $2 \times 10^5$ Pa. When the tip 15 of the preform was extruded through the nozzle 5 of the quartz tube 1, a weight of 100 g was immediately hung from the tip 15 of the preform 11 in the predetermined manner. The preform 11 was pulled at a speed of 4 mm/min. The outer diameter of the resulting preform 11 was 6 mm. In the preform 11 obtained, devitrification of glass was not observed nor the generation of bubbles in the core glass or at the core glass-cladding glass interface was observed. The preform 11 was also excellent in adhesion at the core glass-cladding glass interface.

(2) Glass Fiber-Production Example

A glass fiber was obtained using the preform obtained in (1) above.

Figure 2:
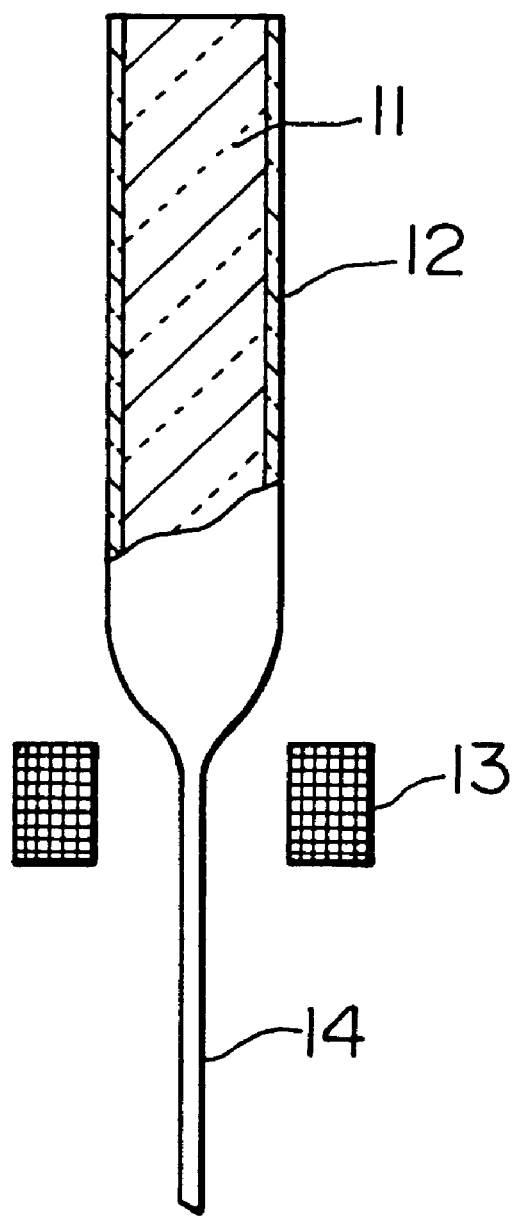
FIG. 2 is a crosssectional view showing the process for producing a fiber of this invention.

As shown in FIG. 2, the periphery of the preform 11 obtained in (1) above was adhesion-coated with a heat-shrinkable tube 12 composed of a fluoroplastic (Teflon FEP), and the lower periphery of the preform 11 was heated to 390° C. by a ring heater 13 and drawn into a fiber 14.

The fiber 14 thus obtained had a triple layer structure of core glass, cladding glass and heat-shrunk resin, and the transmission loss at a wavelength of 2.4 $\mu$m was 0.1 dB/m.

(3) Comparative Production Example

For comparison, the same core rod and cladding tube as in (1) above were used to prepare a preform by the method stated in JP-A-1-230,440 in which a core rod-containing cladding tube was heated in a quartz tube closed at the bottom. Subsequently, the preform obtained was heated and drawn in the same manner as in (2) above to obtain a glass fiber. The glass fiber obtained was subjected to the same test as in (2) above to find that the transmission loss at a wavelength of 2.4 $\mu$m was 0.4 dB/m.

For further comparison, the same core rod and cladding tube as in (1) above were used and the core rod-containing cladding tube was inserted into a quartz tube having a nozzle at the bottom, after which a glass fiber was directly produced therefrom according to the method stated in JP-A-1-226,748 without preparing a preform. The transmission loss of the glass fiber thus obtained was 0.3 dB/m at a wavelength of 2.4 $\mu$m.

Example 2

(1) Preform-Production Example

The same procedure as in Example 1 (1) was repeated, except that the glass composition of the core rod 2 was adjusted to Ge 27 atm %/As 30 atm %/Se 43 atm % and the glass composition of the cladding tube 3 was adjusted to Ge 25 atm %/As 29 atm %/Se 46 atm %. In this case, the outer diameter of the cladding tube 3 was adjusted to 12.5 mm, the inner diameter thereof was adjusted to 10.5 mm, the outer diameter of the core rod 2 was adjusted to 9.5 mm and the aperture of the nozzle 5 of the quartz tube 1 was adjusted to 9 mm. The heating temperature was 400° C. and the pulling speed was 2 mm/min. The preform 11 obtained had an outer diameter of 6.5 mm, and similarly to the preform obtained in Example 1, neither devitrification of glass nor generation of bubbles were observed and the adhesion between the core glass and the cladding glass was excellent.

(2) Glass Fiber-Production Example

The periphery of the preform 11 obtained in (1) above was coated with a heat-shrinkable tube 12 composed of a heat-shrinkable fluoroplastic (vinylidene fluoride resin) and the lower periphery of the preform 11 was heated by a ring heater 13 to 500° C. and drawn into a fiber 14.

The transmission loss of the fiber 14 thus obtained was 0.4 dB/m at a wavelength of 6 $\mu$m.

(3) Comparative Production Example

Using the same core rod and the same cladding tube as in (1) above, a preform was prepared by the method stated in JP-A-1-230,440. Then, the preform was subjected to heating and drawing in the same manner as in (2) above to prepare a glass fiber. The glass fiber thus obtained was subjected to the same measurement as in (2) above to find that the transmission loss at a wavelength of 6 $\mu$m was 0.6 dB/m.

Separately, using a core rod and a cladding tube having the same respective compositions as in (1) above, a glass fiber was directly prepared by the method stated in JP-A-1-226,748 without preparing a preform. The glass fiber thus obtained was subjected to the same measurement as in (2) above to find that the transmission loss at a wavelength of 6 $\mu$m was 0.55 dB/m.

Example 3

(1) Preform-Production Example

The same procedure as in Example 1 (1) was repeated, except that the glass composition of the core rod 2 was Ge 24 atm %/Se 21 atm %/Te 55 atm % and the glass composition of the cladding tube 3 was Ge 23 atm %/Se 24 atm %/Te 53 atm %. In this case, the outer diameter of the cladding tube 3 was 12.5 mm, the inner diameter of the cladding tube 3 was 10.5 mm, the outer diameter of the core rod 2 was 9.5 mm, and the aperture of the nozzle 5 of the quartz tube 1 was 9 mm. The heating temperature was 400° C. and the pulling speed was 2 mm/min. The outer diameter of the preform 11 obtained was 8.0 mm and, similarly to the preform obtained in Example 1, neither devitrification of glass nor generation of bubbles were observed. The adhesion between the core glass and the cladding glass was excellent.

(2) Glass Fiber-Production Example

The periphery of the preform 11 obtained in (1) above was coated with a heat-shrinkable tube 12 composed of heat-shrinkable fluoroplastic (Teflon FEP), and the lower periphery of the preform 11 was heated to 440° C. by a ring heater 13 and drawn into a glass fiber 14.

The transmission loss of the glass fiber thus obtained was 0.4 dB/m at a wavelength of 8 $\mu$m.

(3) Comparative Production Example

Using a core rod and a cladding tube having the same respective compositions as in (1) above, a preform was prepared by the method stated in JP-A-1-230,440 and then heated and drawn in the same manner as in (2) above to obtain a glass fiber. The glass fiber thus obtained was subjected to the same measurement as in (2) above to find that the transmission loss at a wavelength of 8 $\mu$m was 0.6 dB/m.

Separately, using a core rod and a cladding tube having the same respective compositions as in (1) above, a glass fiber was directly prepared without preparing a preform by the method stated in JP-A-1-226,748. The glass fiber obtained was subjected to the same measurement as in (2) above to find that the transmission loss at a wavelength of 8 $\mu$m was 0.55 dB/m.

Example 4

(1) Preform-Production Example

The same procedure as in Example 1 (1) was repeated, except that the glass composition of the core rod 2 was As 40 atm %/S 60 atm % and the glass composition of the cladding tube 3 was Ge 2 atm %/As 37 atm %/S 61 atm % (the first composition). In this case, the outer diameter and inner diameter of the cladding tube 3 were 15.5 mm and 8.0 mm, respectively, the inner diameter of the core rod 2 was 7.5 mm, and the aperture of the nozzle 5 of the quartz tube 1 was 8 mm. The heating temperature was 310° C. and the pulling speed was 2 mm/min. The outer diameter of the preform 11 obtained was 6.5 mm, and, similarly to the preform obtained in Example 1, neither devitrification of glass nor generation of bubbles were observed. The adhesion between the core glass and the clad glass was excellent.

The same procedure as above was repeated, except that the preform 11 obtained above was used as the core rod 2 and the glass composition of the cladding tube 3 was adjusted to Ge 2 atm %/As 37 atm %/S 61 atm % (the first composition). In this case, the outer diameter and the inner diameter of the cladding tube 3 were 15.5 mm and 7.5 mm, respectively, the outer diameter of the core rod 2 was 6.5 mm, the aperture of the nozzle 5 of the quartz tube 1 was 8 mm. The heating temperature was 310° C. and the pulling speed was 2 mm/min. The preform 11 obtained had an outer diameter of 6.5 mm and, similarly to the preform obtained in Example 1, neither devitrification of glass and generation of bubbles were observed. The adhesion between the core glass and the cladding class was excellent.

The same procedure as above was repeated twice, except that the preform 11 obtained above was used as the core rod 2. This procedure was repeated, except that the preform 11 thus obtained was used as the core rod 2 and the glass composition of the cladding tube 3 was adjusted to Ge 1.5 atm %/As 38 atm %/S 60.5 atm % (the second composition). The preform 11 thus obtained had an outer diameter of 6.5 mm and, similarly to the preform obtained in Example 1, neither devitrification of glass nor generation of bubbles were observed. The adhesion between the core glass and the cladding glass was excellent.

Figure 3:
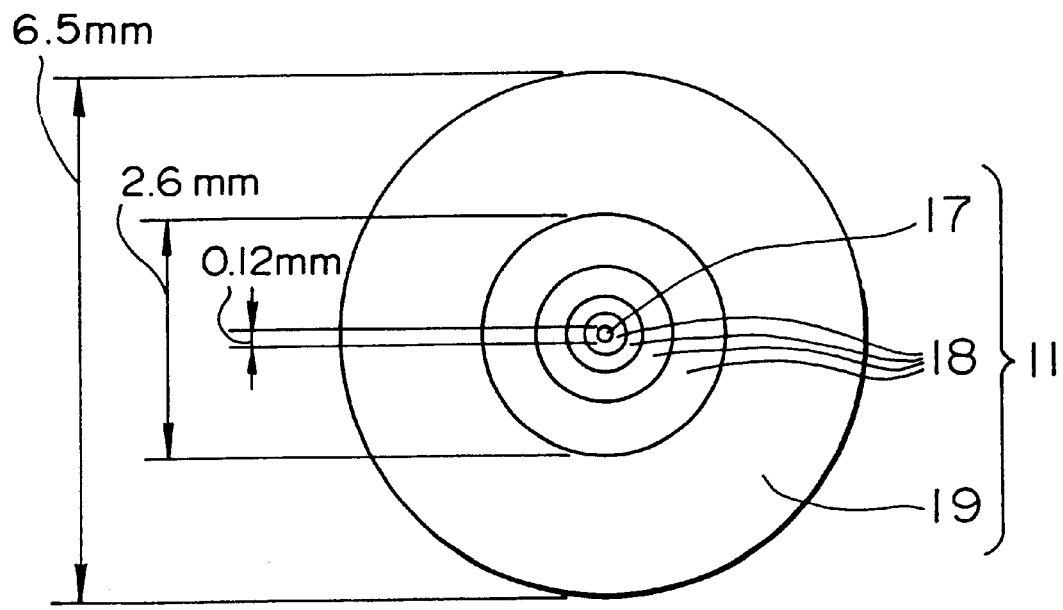
FIG. 3 is a crosssectional view showing the preform obtained in Example 4.

As stated above, the above procedure was repeated five times in total to obtain a preform 11 as shown in FIG. 3 in which the outer diameter of the core glass 17 was 0.12 mm, the outer diameter of the cladding glass 18 of the first composition consisting of four layers was 2.6 mm and the outer diameter of the cladding glass 19 of the second composition was 6.5 mm.

(2) Glass Fiber-Production Example

Figure 4:
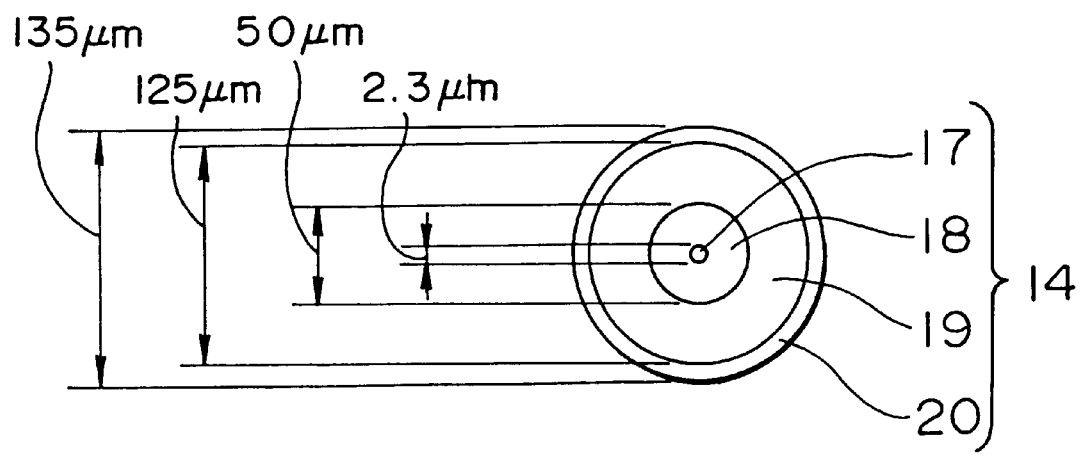
FIG. 4 is a crosssectional view showing the fiber obtained in Example 4.

The periphery of the preform 11 thus obtained was coated with a heat-shrinkable tube 12 composed of a heat-shrinkable fluoroplastic (Teflon FEP) and the lower periphery of the preform 11 was heated by a ring heater 13 to 390° C. and then drawn into a single mode glass fiber 14. The cross-sectional view of the single mode glass fiber 14 was as shown in FIG. 4. As is clear from FIG. 4, in this single mode glass fiber 14, the outer diameter of the core glass 17 was 2.3 $\mu$m, the outer diameter of the cladding glass 18 of the first composition was 50 $\mu$m, the outer diameter of the clad glass 19 of the second composition was 125 $\mu$m, the outer diameter of the fiber including the heat-shrunk resin layer 20 was 135 $\mu$m. The transmission loss of the glass fiber 14 was 0.08 dB/m at a wavelength of 2.4 $\mu$m.

Example 5

Figure 5:
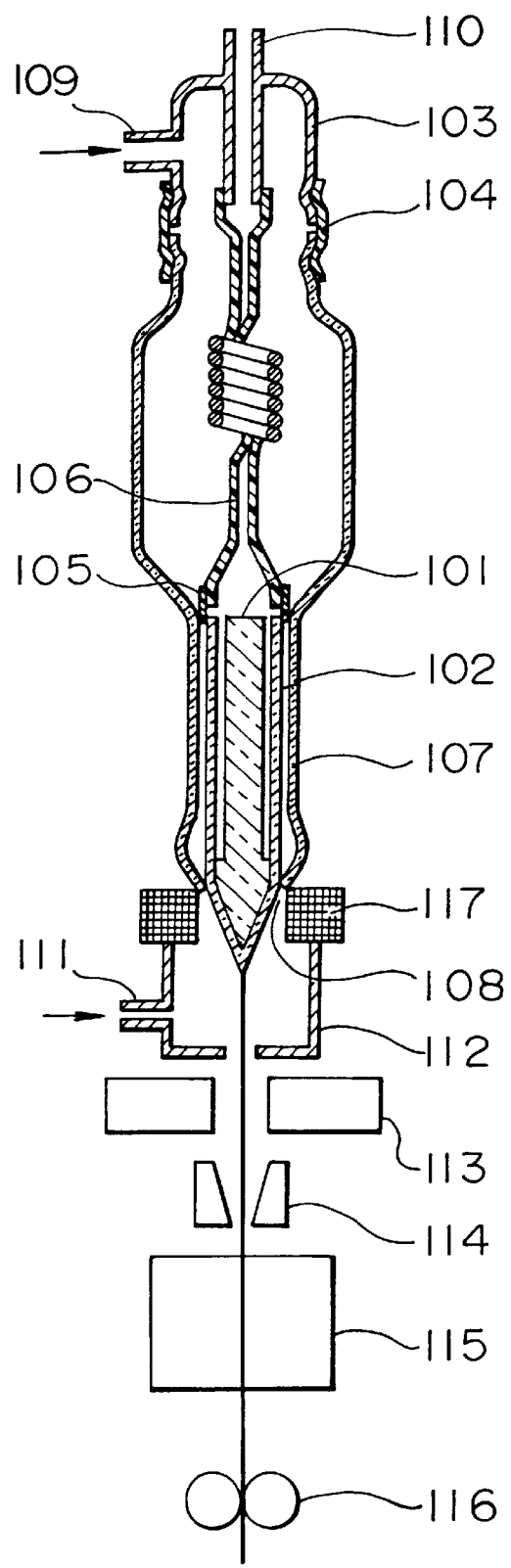
FIG. 5 is an outline cross section of an apparatus for producing the chalcogenide glass fiber of this invention.

Using a production apparatus as shown in FIG. 5, a chalcogenide glass fiber having a core-cladding structure was produced.

In the apparatus for producing a chalcogenide glass fiber shown in FIG. 5, a quartz crucible 107 having the largest diameter in the middle is provided. Under the crucible 107, there are arranged an inert gas inlet 111, a local heater 117, an atmosphere conditioning chamber 112, a fiber diameter measuring instrument 113, a resin coater 114, a UV irradiation chamber 115 and print rollers 116. At the upper end of the crucible 107, a cover 103 having an inlet 109 for a pressurizing inert gas and a suction port 110 are placed and fixed by means of a resin tube 104.

A resin tube 106 is connected to the suction port 110 and the lower end of the resin tube 106 is connected to the upper end of a cladding tube 102 inserted into the crucible 107 by means of a resin tube 105 to hold the cladding tube 102. The crucible 107 has at its bottom a nozzle 108 having an aperture smaller than the outer diameter of the cladding tube 102 but larger than the outer diameter of the core rod 101.

A core glass having a composition of As 40 atm %/S 60 atm % was polished to form a core rod 101 having an outer diameter of 8 mm, and a cladding glass having a composition of As 34 atm%/S 62 atm %/Ge 4 atm % was polished to form a cladding tube 102 having an outer diameter of 10 mm and an inner diameter of 8.5 mm. The core rod 101 was inserted into the cladding tube 102. The resulting assembly consisting of the core rod 101 and the cladding tube 102 was set in the crucible 107 having a nozzle 108 at its bottom, and the crucible 107 was purged with an argon gas.

Subsequently, the vicinity of the lower end of the crucible 107 was locally heated by a local heater 117 to such a temperature that the viscosities of the glasses of the cladding tube 102 and the core rod 101 present therein became $10^6$ poises to fusion-bond the cladding tube 102 to the core rod 101 in the vicinity of the lower end of the crucible 107 and simultaneously uniformly melt the cladding tube 102 at the periphery of the nozzle 108 at the lower end of the crucible 107.

A pressure of $1.47 \times 10^5$ Pa was applied to the periphery of the cladding tube 102 and simultaneously the pressure of the space between the cladding tube 102 and the core rod 101 was reduced to 1.33 Pa to completely unite the cladding tube 102 with the core rod 101, after which the united glass was continuously drawn into a glass fiber having a core diameter of 200 $\mu$m and a clad diameter of 250 $\mu$m.

Just after the spinning, the fiber was coated with a UV curable resin by means of a resin coater 114 and then the UV curable resin was cured in a UV irradiation chamber 115, after which the fiber was wound around a drum (not shown in the figures). The fiber thus obtained was subjected to the measurements to find that the transmission loss at a wavelength of 2.4 $\mu$m was 0.1 dB/m, the tensile strength was as high as 15 kg/mm$^2$, and the number of aperture (NA) was 0.5.

Figure 6:
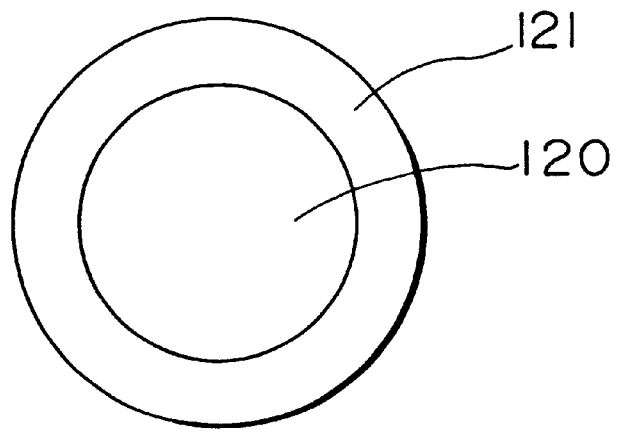
FIG. 6 is a crosssectional view of the fiber obtained in Example 5.

The chalcogenide glass fiber thus obtained had such a structure that the core glass 120 composed of two elements of As (arsenic) and S (sulfur) was covered with a cladding glass 121 composed of three elements of As (arsenic), S (sulfur) and Ge (germanium) as shown in FIG. 6.

Example 6

A core glass having a composition of As 40 atm %/S 60 atm % was polished to form a core rod having an outer diameter of 2 mm, and a first cladding glass having a composition of As 34 atm %/S 62 atm %/Ge 4 atm % was polished to form a first cladding tube having an outer diameter of 50 mm and an inner diameter of 3 mm. Moreover, a second cladding glass having a composition of As 37 atm %/S 62 atm %/Ge 1 atm % was polished to form a second cladding tube having an outer diameter of 110 mm and an inner diameter of 55 mm. The first cladding tube was inserted into the second cladding tube and the core rod was inserted into the first cladding tube, after which the resulting assembly was set in the crucible 107 in the same apparatus as in Example 5. In the same manner as in Example 5, the assembly was heated and continuously drawn into a single mode fiber having a core diameter of 2.4 $\mu$m and a clad diameter of 125 $\mu$m.

The resulting fiber was coated with a resin in the same manner as in Example 5 just after the drawing and wound around a drum. As a result, the refractive index of the second cladding glass became higher than that of the first cladding glass but lower than that of the core glass. The fiber was subjected to measurements to find that the transmission loss at a wavelength of 2.4 $\mu$m was as low as 0.1 dB/m, the tensile strength was as high as 14 kg/mm$^2$, and the number of aperture (NA) was 0.5. Substantially no disturbance light having passed through the cladding glass was observed.

Figure 7:
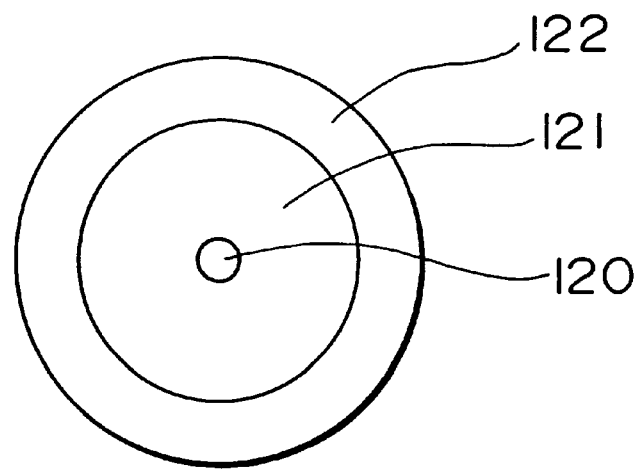
FIG. 7 is a crosssectional view of the fiber obtained in Example 6.

The chalcogenide glass fiber thus obtained had such a structure that a fiber composed of a core glass 120 whose periphery was covered with the cladding glass 121 was further covered with a second cladding glass 122 composed of three elements of As (arsenic), S (sulfur) and Ge (germanium) as shown in FIG. 7.

Examples 7 to 15 and Reference Example

In the same manner as in Example 5 or 6, glasses having the compositions shown in Table 1 (Examples 7 to 15 and Reference Example) were drawn into fibers and the results of measurements of the fibers are shown in Table 2. The unit in Table 1 is atm % and the loss in Table 2 is a transmission loss (unit: dB/m) at a wavelength of 2.4 µm. The unit of strength is $kg/mm^2$. The Reference Example in the last column of the Tables is an example in which both the core glass and the clad glass contained Ge.

TABLE 1

| Example No. | Core glass | | | | 1st Clad glass | | | 2nd clad glass | | |
|---|---|---|---|---|---|---|---|---|---|---|
| | As | S | Ge | Se | As | S | Ge | As | S | Ge |
| 5 | 40 | 60 | | | 34 | 62 | 4 | — | — | — |
| 6 | 40 | 60 | | | 34 | 62 | 4 | 37 | 62 | 1 |
| 7 | 26 | 74 | | | 19 | 75 | 6 | 20 | 76 | 4 |
| 8 | 54 | 46 | | | 48 | 48 | 4 | 51 | 47 | 2 |
| 9 | 48 | 52 | | | 46 | 52 | 2 | 47 | 52 | 1 |
| 10 | 42 | 58 | | | 39 | 57 | 4 | — | — | — |
| 11 | 35 | 65 | | | 34 | 65 | 1 | 34.5 | 65 | 0.5 |
| 12 | 38 | 62 | | | 36 | 60 | 4 | — | — | — |
| 13 | 45 | 55 | | | 40 | 53 | 7 | — | — | — |
| 14 | 31 | 69 | | | 30 | 68 | 2 | 30 | 69 | 1 |
| 15 | 40 | 60 | | | 36 | 61 | 3 | — | — | — |
| Ref. Ex. | 20 | 58 | 20 | 2 | 20 | 60 | 20 | — | — | — |

TABLE 2

| Example No. | Loss | Strength | Disturbance light | NA |
|---|---|---|---|---|
| 5 | 0.1 | 15 | Yes | 0.5 |
| 6 | 0.1 | 14 | No | 0.5 |
| 7 | 0.1 | 14 | No | 0.6 |
| 8 | 0.2 | 15 | No | 0.5 |
| 9 | 0.1 | 14 | No | 0.3 |
| 10 | 0.1 | 14 | Yes | 0.5 |
| 11 | 0.1 | 15 | No | 0.2 |
| 12 | 0.1 | 16 | Yes | 0.5 |
| 13 | 0.1 | 14 | Yes | 0.6 |
| 14 | 0.1 | 14 | No | 0.3 |
| 15 | 0.1 | 14 | Yes | 0.4 |
| Ref. Ex. | 0.3 | 11 | Yes | 0.4 |

From the above results, it can be seen that as is clear from comparison with the Reference Example, this invention using a core glass free from Ge and a clad glass containing Ge is significantly lower in transmission loss and higher in tensile strength. In particular, when the core glass composition is such that the proportion of As is in the range of 25 to 55 atm % and the proportion of S is in the range of 45 to 75 atm % and when the cladding glass composition is in such a range that the proportion of As is in the range of 18 to 54 atm %, the proportion of S is in the range of 46 to 80 atm % and the proportion of Ge is in the range of 0.5 to 7 atm %, such effects are obtained that the transmission loss is reduced and the mechanical strength is enhanced.

In Examples 7, 8, 9, 11 and 14 in which the fiber is covered with the second cladding glass, the refractive index of the second cladding glass becomes higher than that of the first cladding glass and lower than that of the core glass. In particular, when the second cladding glass composition is such that the proportion of As is in the range of 18 to 54 atm %, the proportion of S is in the range of 46 to 80 atm % and the proportion of Ge is in the range of 0.5 to 7 atm %, it has been confirmed that the disturbance light is effectively prevented.

What is claimed is:

1. A process for producing a preform for a chalcogenide glass fiber which comprises the steps of:
    (a) inserting a cladding chalcogenide glass tube, having contained therein a chalcogenide glass rod for core, into a quartz tube having at its bottom a nozzle having an aperture smaller than an outer diameter of the cladding tube,
    (b) locally heating the bottom of the quartz tube to soften a chalcogenide glass to a temperature 40–150° C. below the drawing temperature, and
    (c) hanging a weight from a tip of the preform and pulling out the cladding tube having contained therein and adhered thereto the glass rod core.

2. The process for producing a preform for a chalcogenide glass fiber according to claim 1, wherein the pressure in the space between the glass rod for core and the cladding tube is adjusted relatively lower than the pressure in the space between the cladding tube and the quartz tube.

3. A process for producing a preform for a chalcogenide glass fiber which comprises
    (a) inserting a cladding chalcogenide glass tube, having contained therein a chalcogenide glass rod for core, into a quartz tube having at its bottom a nozzle having an aperture smaller than an outer diameter of the cladding tube,
    (b) locally heating the bottom of the quartz tube to soften a chalcogenide glass to a temperature 40–150° C. below the drawing temperature, and
    (c) hanging a weight from a tip of the preform and pulling out the cladding tube having contained therein and adhered thereto the glass rod core,
    (d) inserting into a second cladding tube the preform of step (c) as a glass rod,
    (e) repeating the process of steps (a), (b) and (c) at least one time to obtain a preform devoid of gaps between the cladding layers and between the innermost cladding layer and the glass rod for a single mode fiber having a very small core diameter as compared with a cladding diameter.

4. A process for producing a chalcogenide glass fiber which comprises polymer-coating a preform for a chalcogenide glass fiber obtained by the process according to claim 1 with a polymer-coating material and then heating and drawing the coated preform into a fiber.

5. The process for producing a chalcogenide glass fiber according to claim 4, wherein all of the preform is coated with a polymer-coating material and then heated and drawn into a glass fiber having a triple layer structure of core glass, cladding glass and polymer-coating material.

6. The process for producing a chalcogenide glass fiber according to claim 4, wherein the preform except for its tip area is coated with a polymer-coating material and then the preform was heated and drawn into a coat-free fiber having a double layer structure of core glass and cladding glass.

7. A process for producing a chalcogenide glass fiber provided with a protective coating layer, which comprises passing through a coating cup with a nozzle at its bottom, a chalcogenide glass fiber obtained by drawing a preform for a chalcogenide glass fiber obtained by the process according to claim 1.

8. A process for producing a chalcogenide glass fiber which comprises the steps of:

(a) inserting a cladding chalcogenide glass tube, having contained therein a chalcogenide glass rod for core, into a quartz tube having at its bottom a nozzle having an aperture smaller than an outer diameter of the cladding tube, (b) locally heating the bottom of the quartz tube at a temperature which is lower than the drawing temperature and at which the cladding glass united with the core glass can be pulled out from the nozzle of the quartz tube without causing crystallization in the core glass and at the core glass-cladding glass interface, pulling out the cladding tube having contained therein and adhered thereto the glass rod core to produce a preform, polymer coating the preform of step (c), except for its tip, with a polymer coating material, and thereafter heating and drawing the preform into a coat-free glass fiber having a double layer structure of core glass and cladding glass.

9. A process for producing a chalcogenide glass fiber which comprises:

(a) inserting a cladding chalcogenide glass tube, having contained therein a chalcogenide glass rod for core, into a quartz tube having at its bottom a nozzle having an aperture smaller than the outer diameter of the cladding tube, (b) locally heating the bottom of the quartz tube at a temperature which is lower than the drawing temperature and at which the cladding glass united with the core glass can be pulled out from the nozzle of the quartz tube without causing crystallization in the core glass and at the core glass-cladding glass interface, (c) pulling out the cladding tube having contained therein and adhered thereto the glass rod core, (d) inserting into a second cladding tube the preform of step (c) as a glass rod, (e) repeating the process of steps (a), (b) and (c) at least one time to obtain a preform devoid of gaps between the cladding layers and between the innermost cladding layer and the glass rod for a single mode fiber having a very small core diameter as compared with a cladding diameter, (f) polymer coating the preform of step (e), except for its tip, with a polymer coating material, and thereafter (g) heating and drawing the preform into a coat-free glass fiber having a triple layer structure of core glass, cladding glass and polymer coating material.

* * * * *